3,705,871
PROCESS FOR OBTAINING POLYLACTAM POWDERS

Michel Biensan, Billere, and Philippe Bruant, Pau, France, assignors to Societe Nationale des Petroles d'Aquitaine Tour Aquitaine, Courbevoie, France
No Drawing. Filed Dec. 23, 1969, Ser. No. 887,762
Claims priority, application France, Dec. 31, 1968, 182,520
Int. Cl. C08c *11/22*
U.S. Cl. 260—33.6 R                    9 Claims

ABSTRACT OF THE DISCLOSURE

A process for the production of polylactams in pulverulent form without the formation of lumps is provided in which the catalyst and/or activator is introduced into the solution of the monomeric lactam continuously during an initial period of the polymerization until at least 20% of the lactam has been converted to polylactam.

---

The present invention relates to an improvement in the production of pulverulent polymers of lactams, and more particularly to those of which the ring contains more than 10 carbon atoms; it is especially concerned with the production of the poly-omega-lauroyl lactam powder known under the name of nylon-12.

The polymerisation of lactams is well-known at the present time; the conventional method consists in using sodium or sodium compounds as the catalyst, concurrently with an organic activator, such as, for example, caprolactam-N-carboxyanilide, isocyanates, carbodiimides, cyanimides, acetyl lactams, triazines, ureas, N-substituted imides or others. When the operation takes place in solution or suspension, it is usual to work at temperatures of the order of 100° to 160° C. However, the polymerisation of lactams having more than 10 carbon atoms in the ring, and particularly the polymerisation of lauroyl lactam, encounters difficulties when it is desired to obtain the polymer in powder form; setting or lump formation or agglomerates are produced, even with energetic stirring, as soon as the temperature is raised with a view to accelerating the polymerisation. On the other hand, when the activator being used is in gaseous form, as is the case with $CO_2$ in one known process, the results are not reproducible and this leads to irregularities in manufacture. All these inconveniences are very troublesome in industrial production, and it has so far not been possible to manufacture a fine polymer powder at a sufficient polymerisation speed and in a regular manner, without running the risks of a lump formation or, at least, without obtaining large agglomerates in addition to the powder.

The present invention provides an improvement by which it is possible to avoid the lump formation and to obtain with certainty only a fine powder every time.

The invention results from the unexpected discovery that the formation of lumps can be avoided, when the concentration of activated catalyst in the lactam solution is small, while the concentration of monomer is high in this solution, that is to say, while the polymerisation speed is fast; the proportion of activator relative to the remaining monomer must increase progressively in proportion as the content of monomer increases because of the polymerisation.

The new process, which consists in producing a polylactam powder by polymerisation of a lactam in solution in an appropriate solvent, in the presence of an anionic catalyst and an activator used in the solid or liquid state, is characterised in that the activator and/or the catalyst are introduced continuously during the polymerisation, at least for an initial period of the latter, until an appreciable proportion of lactam is converted into pulverulent polymer.

The minimum duration of the continuous introduction according to the invention depends on the polymerisation temperature and the degree of conversion of the lactam. In the case of omega-lauroyl lactam, the continuous introduction must be continued for a period such that the degree of conversion of the lactam is at least 20%.

In fact, it is more certain to prolong the period of continuous introduction of the activator or catalyst well beyond the minimum time, as defined above. However, as there is no interest in obtaining an excess of activated catalyst at the end of the polymerisation, the preferred form of the invention consists in effecting the introduction of the activator into the polymerisation medium until the moment when the conversion of the initial monomer into polymer in powder is about 60 to 80%.

For practical reasons, it is easier to form the sodium salt of the lactam by reacting the lactam with the anionic catalyst itself, particularly NaH, prior to the polymerisation, in the reaction medium, and then only to have to introduce continuously an easily adjustable quantity of a solution of solid or liquid organic activator. Nevertheless, the invention can possibly be carried out by continuously adding the catalyst itself simultaneously with the addition of the activator. It is also possible to supply all the activator at the start and then to add the catalyst continuously during the polymerisation.

In one particular form of the invention, the temperature is raised progressively during the polymerisation. The temperature is preferably raised in such a manner that it is lower than or equal to that which can be calculated by the equation $P = 0.5T - 40$, P being the degree of conversion of the lactam.

In another variant of the invention, a certain quantity of fine powder, which can advantageously be that of the polymer itself which is to be prepared, or even a mineral filler, is added to the reaction medium before the polymerisation. Depending on the circumstances, the proportion of powder thus introduced at the start is of the order of 5 to 50% relative to the monomer which is used.

The invention is illustrated in non-limiting manner by the following examples.

EXAMPLE 1

300 g. of lactam-12 (omega-lauroyl lactam) are dissolved in 500 ml. of xylene in the presence of 3 mole percent of sodium hydride, i.e. 1.08 g.

The liquid is kept at 85° C. while stirring continuously at 570 r.p.m.

2%, i.e. 6.93 g., of carboxyanilide are added dropwise for 1¼ hours to the agitated liquid.

After this time, there are found 150 g. of polyamide as a fine powder, this corresponding to a conversion of 50%.

In a parallel test, all the conditions are the same, except that the carboxyanilide is introduced in 7 fractions, that is to say, in 7 times 0.99 g.; a first fraction is added at the commencement of polymerisation and then one fraction every 12 minutes. Under these conditions, 150 g. of polymer are still obtained, but only 100 g. are in the form of a fine powder, the remainder being in the form of agglomerates.

EXAMPLE 2

300 g. of lactam-12, dissolved in 450 ml. of xylene, in the presence of 1.08 g. of sodium hydride, are stirred at 460 r.p.m., after having added 24 g., i.e. 8%, of a fine polyamide-12 powder.

With the medium kept at 95° C., 7 g. of carboxyanilide are continuously introduced dropwise for 1¼ hours. After this time, there are obtained 250 g. of fine powder with a few small agglomerates; the conversion of the monomer is here found to be 83%.

In a similar preparation, the carboxyanilide was added in 7 fractions at time intervals of 12 minutes. Under these conditions, there is a lump formation of the polylactam from the start of the polymerization.

EXAMPLE 3

After having dissolved 200 g. of lactam in 500 ml. of xylene at 120° C., 100 g. of fine poyamide-12 powder are added to the solution. 2% of sodium hydride, i.e. 0.4 mg., are introduced into the suspension and the temperature is raised to 130° C.

2% of carboxyanilide, i.e. 4.62 g. of this activator, are continuously added for 1 hour to the suspension, which is stirred at the speed of 300 r.p.m.

A polyamide powder, with a grain size of about 50 microns, is obtained in this way with a yield of 95% relatively to the lactam which is used.

In an identical operation, except as regards the introduction of the activator, all of which is supplied at the start, the yield of polymer is only 60%.

EXAMPLE 4

In a 20-litre reactor, equipped with an anchor-type agitator, a reflux condenser and an opening for the introduction of the reactants, there are placed 4.80 kg. of dry lactam-12 and 8.5 litres of anhydrous xylene.

The contents of the reactor are stirred at a speed of 350 r.p.m. and brought to 100° C.; 24 g. of NaH in an amount of 50% in a mineral oil are introduced and the reaction is allowed to take place for 15 minutes at 100° C.

The reaction medium is then cooled to 85° C. and 480 g. of anatase ($TiO_2$), i.e. 10% by weight of the lactam, are added. 86.4 ml. of phenyl isocyanate, in solution in 500 ml. of anhydrous xylene, are then continuously introduced for 1 hour. During this time, the temperature is raised progressively to 135° C. and it is kept at this temperature for another hour.

After cooling and emptying the reactor, the reaction mixture is filtered under vacuum, and the powder thus obtained is washed twice with 5 litres of methanol. The powder is then dried for several hours at 100° C. under vacuum.

In this way, 5.2 kg. of fine polyamide powder are obtained, this representing a yield of 98.1%.

The inherent viscosity in meta-cresol of the resulting product is 1.03.

The grain size of the powder, evaluated screening, is below 160 microns.

By spraying this powder by means of an electrostatic pistol on to a metal plate, an excellent coating of polyamide-12 is obtained.

EXAMPLE 5

The general conditions are the same as in Example 4, but the reaction medium is cooled to 95° C., the stirring speed is 300 r.p.m. and the $TiO_2$ powder is replaced by 400 g. of fine polyamide-12 powder, that is to say, about 8.3% relative to the weight of the lactam. There are then obtained 5 kg. of fine poyamide-12 powder, which corresponds to a yield of 96% relative to the lactam being used, taking into account the added powder.

The inherent viscosity in meta-cresol of this product is 1.00. The grain size, determined by wet screening, is smaller than 400μ.

EXAMPLES 6 TO 9

In this series of examples, the temperature at which the introduction of the activator is commenced is caused to vary by powder being introduced beforehand when required. In these polymerisation reactions, 600 g. of lactam-12 are dissolved at 120° C. in 900 ml. of xylene twice distilled with $CaH_2$ and Na. 2 mole percent of NaH relatively to the lactam are then introduced, this amount being 1.44 g., and reaction is allowed to take place for 15 minutes.

The medium is then brought to the desired temperature $t°$ for starting polymerisation, at which time the continuous introduction of 2 mole percent of phenyl isocyanate in solution in 100 ml. of twice-distilled xylene is commenced. This introduction leasts one hour, during which the temperature is raised progressively from $t°$ C. up to 135° C.; this latter temperature is then maintained for 1 hour, after which the polymerised product is separated and washed.

The partial conditions and results are given in the following table.

| Example No. | 6 | 7 | 8 | 9 |
|---|---|---|---|---|
| $t°$ C. | 80 | 95 | 100 | 105 |
| Percent of powder introduced at the start | 0 | 7.5 | 10 | 12.5 |
| Weight of polyamide obtained, g. | 570 | 590 | 635 | 650 |

EXAMPLE 10

In this example, the activator being used was acetyl caprolactam.

In a series of operations which were carried out, 600 g. of lactam-12 were dissolved in 900 ml. of xylene at 120° C. 2 mole percent of NaH, i.e. 1.44 g., were added, and then, after cooling to 95° C., 8% of fine polyamide powder were introduced into the solution.

50 ml. of xylene, containing acetyl caprolactam in solution, in a total quantity of 2 mole percent relative to the lactam, i.e. 9.3 g., were introduced dropwise over a period of 1 hour into the stirred reaction medium. During this hour, the temperature was raised progressively to 135° C.

The polymerisation started in the region of 115° C.

After a total polymerisation time of 2 hours, of which the second hour was at 135° C., and after separating and washing the polymer, fine powder was collected in quantities which represented a yield of 65 to 85%. The powders obtained had inherent viscosities in metacresol in the region of 1; their average grain size was about 30 to 1,000 microns.

EXAMPLE 11

By replacing the activator used in Example 10 by acetyl dodecalactam, there was obtained a yield of about 60%, an inherent viscosity of about 0.95 and a grain size from 40 to 1000 microns.

EXAMPLE 12

The replacement of the acetyl caprolactam of Example 10 by benzoyl caprolactam led to a yield of 75% and viscosities and grain sizes equal to those of Example 10.

EXAMPLE 13

A polymerisation, under the general conditions of Example 10, was carried out with 300 g. of lactam-12 in 400 ml. of xylene, in the presence of 8% of fine polyamide powder introduced beforehand, and 2 mole percent of diphenyl carbodiimide.

The starting temperature was 95° C. and a polyamide powder yield of 88% was obtained.

The powder had an inherent viscosity of about 0.9 and an average particle size of the order of 500μ.

EXAMPLE 14

The process of the invention is here experimentally carried out with another solvent, dichlorobenzene, and at a fixed temperature of 120° C.; the initial lactam had added to it 33% of fine powder of poly-omega-lauroyl lactam.

The quantities being employed are: 300 g. of lactam-12, 400 ml. of dichlorobenzene, 100 g. of previously introduced polymer powder and 2% of NaH.

With the reaction mixture brought to 120° C., there were introduced continuously thereinto, for 1 hour, 100 ml. of dichlorobenzene containing a quantity of benzoyl caprolactam equal to 2 mole percent of the quantity of lactam.

After introduction of this activator, the medium was maintained for another hour at 120° C.

The polymer powder is obtained with a yield of 80%; its inherent viscosity is about 1 and its grain size is from 15 to 80μ.

EXAMPLES 15 TO 17

In these examples, the behavour of 3 different solvents was studied.

The polymerisation was carried out on 300 g. of lactam-12 in 400 ml. of thoroughly dry solvent and 2% of NaH, the dissolving operation taking place at 120° C. The medium was stirred at 500 r.p.m. The continuous introduction of 2 mole percent of carboxyanilide in solution of 100 ml. of the same solvent as that which had served for dissolving the lactam was commenced at 85° C. This introduction lasted 1 hour, during which time the temperature was raised progressively from 85 to 135° C. Thereafter, the mixture was heated for another hour at 135° C. The total polymerisation time was thus 2 hours.

The results of these polymerisation reactions were:

| Example No. | 15 | 16 | 17 |
|---|---|---|---|
| Solvent | Cummee | Dichlorobenzene | Decalin. |
| Yield, percent | 98 | 95 | 91. |
| Viscosity | 1.03 | 1.08 | 1.15. |

The foregoing examples show that, by means of the process according to the invention, it is possible to obtain a polymer powder with a desired grain size, in good yields and without any lump formation.

We claim:

1. A process for the production of a finely divided polylactam powder, which comprises reacting omega-lauroyl lactam monomer in solution with sodium or a sodium compound anionic catalyst to form the sodium salt of the lactam, continuously adding an organic activator to the solution without appreciable time lag between the addition of incremental quantities of the activator while progressively increasing the temperature of the reaction mixture within the range from 85° to 240° C. until at least 20% of the omega-lauroyl lactam is converted to polylauroyl lactam, and thereafter further heating the reaction mixture without the addition of further activator, to produce the polylactam in finely divided powder form without the concurrent formation of large polymeric agglomerates.

2. The process of claim 1, in which the lauroyl lactam monomer is initially dissolved in a solvent selected from the group consisting of xylene, dichlorobenzene, cumene or Decalin.

3. Process according to claim 1, characterized in that the period of continuous introduction is extended to the moment when the conversion of initial monomer into polymer is about 60 to 80%.

4. Process according to claim 1, characterized in that the polymerization temperature is raised progressively in such a way that it is always below $2P+80$, P being the degree of conversion of the lactam.

5. Process according to claim 1, characterized in that the reaction medium has added thereto at the start a proportion of 5 to 50% by weight of the monomer of a fine powder which is insoluble in the medium.

6. Process according to claim 5, characterized in that the powder is a mineral filler.

7. Process according to claim 5, characterized in that the powder is a polyamide.

8. Process according to claim 1 characterized in that the activator is introduced continuously while the temperature of the solution is progressively raised from 85°–120° C.

9. Process according to claim 1 characterized in that the activator is continuously introduced while the temperature is progressively raised from 85° C. to 135° C., and the temperature is thereafter maintained at 135° C. without further introduction of activator and catalyst until the end of the polymerization.

References Cited

UNITED STATES PATENTS

| 2,907,755 | 10/1959 | Lautenschlager et al. 260—78 L |
| 3,061,592 | 10/1962 | Schnell et al. 260—78 L |
| 3,419,517 | 12/1968 | Hedrick et al. 260—37 |
| 3,450,662 | 7/1969 | Tierney 260—30.8 |
| 3,484,415 | 12/1969 | Sahler 260—78 |
| 3,488,319 | 1/1970 | Miller 260—47 |

MORRIS LIEBMAN, Primary Examiner

S. M. PERSON, Assistant Examiner

U.S. Cl. X.R.

260—33.8 R, 37 N, 78 L